(12) United States Patent
Hong et al.

(10) Patent No.: US 12,489,126 B2
(45) Date of Patent: *Dec. 2, 2025

(54) FUEL CELL WATER TREATMENT SYSTEM

(71) Applicants: HYUNDAI MOTOR COMPANY, Seoul (KR); KIA CORPORATION, Seoul (KR)

(72) Inventors: Jeong Hwan Hong, Hwaseong-si (KR); Jong Min Jang, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 420 days.

This patent is subject to a terminal disclaimer.

(21) Appl. No.: 17/983,123

(22) Filed: Nov. 8, 2022

(65) Prior Publication Data
US 2023/0411653 A1 Dec. 21, 2023

(30) Foreign Application Priority Data
Jun. 16, 2022 (KR) .................. 10-2022-0073638

(51) Int. Cl.
*H01M 8/04291* (2016.01)
*B60R 15/02* (2006.01)
*H01M 8/04119* (2016.01)

(52) U.S. Cl.
CPC ......... *H01M 8/04291* (2013.01); *B60R 15/02* (2013.01); *H01M 8/04164* (2013.01); *H01M 2220/20* (2013.01)

(58) Field of Classification Search
CPC .......... H01M 8/04291; H01M 8/04164; B60R 15/02
See application file for complete search history.

(56) References Cited

U.S. PATENT DOCUMENTS 3,829,368 A * 8/1974 Wesley ............... C02F 1/46104
  204/278
5,005,787 A * 4/1991 Cullingford ............. C02F 9/00
  47/62 N (Continued)

FOREIGN PATENT DOCUMENTS

JP 2003275703 A 9/2003
JP 2004055378 A 2/2004

(Continued)

OTHER PUBLICATIONS

Office Action mailed Aug. 27, 2024 cited in corresponding U.S. Appl. No. 18/077,805; 8 pp.

(Continued)

*Primary Examiner* — Paul R Durand
*Assistant Examiner* — Michael J. Melaragno
(74) *Attorney, Agent, or Firm* — Lempia Summerfield Katz LLC

(57) ABSTRACT

A system for treating water produced from a fuel cell in a mobility device is provided. The system includes a fuel cell water storage to receive and store the fuel cell water discharged from the fuel cell in the mobility device, and a cleaning device configured to be extracted from or retracted into an inside of the mobility device. In particular, the cleaning device receives the fuel cell water from the fuel cell water storage and discharges the fuel cell water through a faucet head.

15 Claims, 4 Drawing Sheets

(56) References Cited

U.S. PATENT DOCUMENTS

| | | | |
|---|---|---|---|
| 6,098,346 A * | 8/2000 | Miller | B60P 3/36 296/22 |
| 6,352,792 B1 * | 3/2002 | Parchamazad | B01J 8/0221 429/425 |
| 7,204,536 B2 * | 4/2007 | Kunz | B60P 3/34 296/26.15 |
| 7,213,664 B2 | 5/2007 | Nomura et al. | |
| 9,963,240 B2 | 5/2018 | Boodaghians | |
| 10,569,690 B2 * | 2/2020 | Millis | A47L 17/02 |
| 2002/0177022 A1 | 11/2002 | Shimonosono | |
| 2002/0182463 A1 | 12/2002 | Jones | |
| 2003/0024685 A1 * | 2/2003 | Ace | F24D 18/00 165/45 |
| 2003/0031902 A1 | 2/2003 | Balasubramanian | |
| 2004/0043276 A1 * | 3/2004 | Hoffjann | H01M 8/0612 429/411 |
| 2004/0081861 A1 * | 4/2004 | Parchamazad | H01M 8/04022 429/513 |
| 2004/0247953 A1 * | 12/2004 | Dossas | H01M 8/04291 429/422 |
| 2005/0055766 A1 | 3/2005 | Warning | |
| 2006/0033520 A1 | 2/2006 | Mai | |
| 2006/0065597 A1 * | 3/2006 | Kunczynski | B01D 61/06 210/321.66 |
| 2009/0004518 A1 | 1/2009 | Fujita | |
| 2009/0282735 A1 * | 11/2009 | Fien | C02F 1/005 423/580.1 |
| 2012/0045699 A1 * | 2/2012 | Atreya | H01M 8/0612 429/408 |
| 2012/0073982 A1 * | 3/2012 | Lambie | C25B 1/04 205/343 |
| 2013/0189594 A1 * | 7/2013 | Breit | B64D 11/04 165/41 |
| 2013/0209901 A1 * | 8/2013 | Breit | H01M 8/04074 429/410 |
| 2014/0255733 A1 * | 9/2014 | Masset | H01M 8/04022 429/408 |
| 2016/0380279 A1 | 12/2016 | Breit et al. | |
| 2018/0170235 A1 * | 6/2018 | Millis | B60P 3/34 |
| 2020/0263876 A1 * | 8/2020 | Gross | F24C 3/14 |
| 2020/0361360 A1 * | 11/2020 | Parker | B60N 3/16 |
| 2021/0332571 A1 * | 10/2021 | Eldibany | E03C 1/057 |
| 2023/0411653 A1 * | 12/2023 | Hong | B60R 15/02 |
| 2024/0011263 A1 * | 1/2024 | Hong | E03C 1/044 |
| 2024/0082610 A1 * | 3/2024 | Shin | H01M 8/04029 |

FOREIGN PATENT DOCUMENTS

| | | | | |
|---|---|---|---|---|
| KR | 20060033520 A | | 4/2006 | |
| KR | 20200127298 A | | 11/2020 | |
| WO | WO-03012348 A2 * | 2/2003 | | F24D 11/0214 |
| WO | WO-2019197078 A1 * | 10/2019 | | A47J 31/005 |

OTHER PUBLICATIONS

Dear My Hero'—Hydrogen Cleaning Truck of Hyundai Motor Group, Youtube, Dec. 30, 2021, 3 pages, https://www.youtube.com/watch?v=TTbLuC_UXFQ.

* cited by examiner

FUEL CELL WATER TREATMENT SYSTEM

CROSS-REFERENCE TO RELATED APPLICATION

This application claims the benefit of and priority to Korean Patent Application No. 10-2022-0073638, filed in the Korean Intellectual Property Office on Jun. 16, 2022, the entire contents of which are incorporated herein by reference.

TECHNICAL FIELD

The present disclosure relates to a system for efficiently treating water produced from a fuel cell in a process of generating electricity from the fuel cell.

BACKGROUND

The statements in this section merely provide background information related to the present disclosure and may not constitute prior art.

Hydrogen fuel cells are a power generation system that directly converts chemical energy into electrical energy, without a combustion process, by an electrochemical reaction that occurs when hydrogen as a fuel gas and oxygen as an oxidizing gas are mixed. Such hydrogen fuel cells are a high-efficiency clean energy conversion device that may continuously generate electricity by receiving hydrogen and oxygen from external sources.

The hydrogen fuel cell discharges water and vapor as byproduct of the reaction in the hydrogen fuel cells.

The hydrogen fuel cells are being applied as power sources for various mobility devices such as vehicles, ships, trains, aircrafts, and the like.

SUMMARY

The present disclosure has been made to solve the above-mentioned problems occurring in the prior art while advantages achieved by the prior art are maintained intact.

An aspect of the present disclosure provides a system capable of efficiently utilizing water (hereinafter, fuel cell water) produced from a fuel cell of a mobility device. The system inhibits or prevents the fuel cell water from being frozen in the process of utilizing the fuel cell water.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, a system for treating water produced from a fuel cell in a mobility device may include a fuel cell water storage to receive and store the fuel cell water discharged from the fuel cell in the mobility device. The system further includes a cleaning device configured to be extracted from or retracted into an inside of the mobility device. The cleaning device may receive the fuel cell water from the fuel cell water storage and discharge the fuel cell water through a faucet head of the cleaning device.

BRIEF DESCRIPTION OF THE DRAWINGS

The above and other objects, features and advantages of the present disclosure should be more apparent from the following detailed description taken in conjunction with the accompanying drawings.

Figure 1:
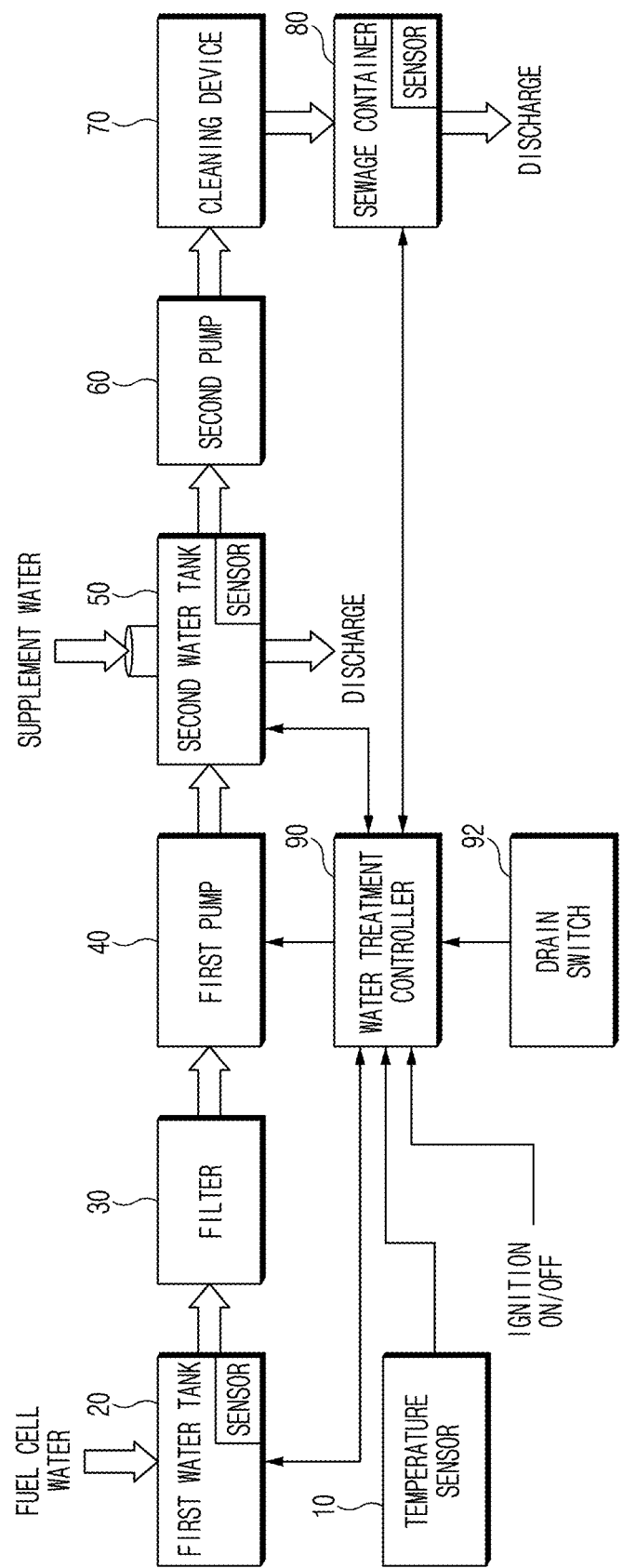
FIG. 1 is a block diagram schematically illustrating the configuration of a system for treating fuel cell water of a hydrogen electric vehicle, according to an embodiment of the present disclosure.

The drawings described herein are for illustration purposes only and are not intended to limit the scope of the present disclosure in any way.

DETAILED DESCRIPTION

Hereinafter, some embodiments of the present disclosure are described in detail with reference to the accompanying drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions has been ruled out in order not to unnecessarily obscure the gist of the present disclosure.

When a component, device, element, or the like of the present disclosure is described as having a purpose or performing an operation, function, or the like, the component, device, or element should be considered herein as being "configured to" meet that purpose or to perform that operation or function.

Figure 2:
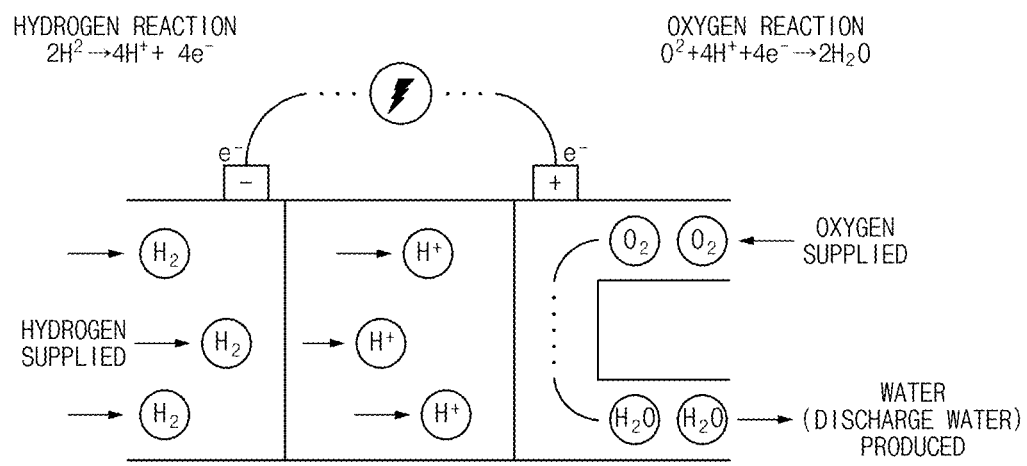
FIG. 2 is a view illustrating the principle of generating electricity from a fuel cell in a hydrogen electric vehicle, according to an embodiment of the present disclosure.

FIG. 1 is a block diagram schematically illustrating the configuration of a system for treating fuel cell water in a hydrogen electric vehicle according to an embodiment of the present disclosure, and FIG. 2 is a view illustrating the principle of generating electricity from a fuel cell in a hydrogen electric vehicle. In addition, FIG. 3 is a view illustrating a cleaning device provided in a hydrogen electric vehicle.

Figure 3:
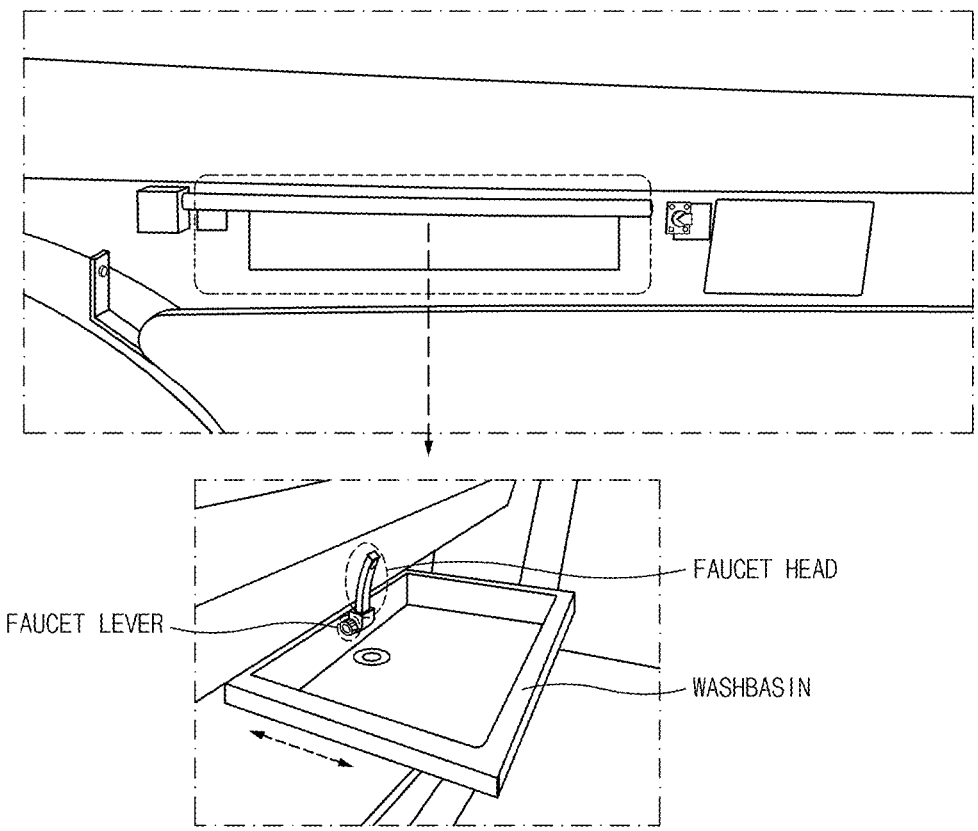
FIG. 3 is a view illustrating the structure of a cleaning device provided in a hydrogen electric vehicle, according to an embodiment of the present disclosure.

Referring to FIGS. 1-3, the system for treating fuel cell water in the hydrogen electric vehicle may include a temperature sensor 10, a first water tank 20, a filter 30, a first pump 40, a second water tank 50, a second pump 60, a cleaning device 70, a sewage container 80, a water treatment controller 90, and a drain switch 92.

The temperature sensor 10 may sense an external temperature of the hydrogen electric vehicle, and may provide the sensed information to the water treatment controller 90.

The first water tank 20 may receive and primarily store water (the fuel cell water) produced in the process of generating electricity from the fuel cell of the hydrogen electric vehicle. The first water tank 20 may sense an amount of the stored fuel cell water and provide the sensed information to the water treatment controller 90. In one embodiment, the first water tank 20 may include a level sensor which senses an amount of the stored fuel cell water by sensing a water level of the stored fuel cell water. The level sensor of the first water tank 20 may provide the sensed information to the water treatment controller 90.

The fuel cell in the hydrogen electric vehicle is a power generating system which directly converts chemical energy to the electrical energy, without a combustion process, through an electrochemical reaction made by mixing hydrogen ($H_2$), which is fuel gas, and oxygen ($O_2$), which is oxidizing gas, as illustrated in FIG. 2. When the hydrogen ($H_2$) is supplied to the fuel cell, the hydrogen ($H_2$) is divided into an electron (e−) and a hydrogen ion (H+). In this case, the generated electrons are transferred to an external circuit to be used as a power source of a vehicle. Hydrogen ions separated from the hydrogen pass through an electrolyte film to make a reaction with oxygen in the air supplied to the fuel cell at an opposite side of the electrolyte film, thereby producing water. According to the present embodiment, the water produced in the same manner is supplied to the first water tank 20 through an exhaust pipe, without being discharged to an outside of the vehicle The filter 30 may be positioned at the side of an outlet of the first water tank 20. The filter 30 is configured to filter out pollutants (fine particles, micro-organisms, or a flexible material) contained in the fuel cell water in a process of moving the fuel cell water from the first water tank 20 into the second water tank 50, as the first pump 40 operates. For example, the fuel cell water produced from the fuel cell may move to the first tank 20 through an exhaust pipe formed of metal, and various foreign substances may be introduced in the fuel cell water in this process. The filter 30 removes the foreign substances from the fuel cell water, such that a user uses the fuel cell water as clean water to clean the body of the user. In addition, the fuel cell water is at pH 5.2 which indicates an acidic property. Accordingly, the fuel cell water may not be used as drinking water. Accordingly, the filter 30 may purify the fuel cell water by removing the acidity of the fuel cell water, such that the purified fuel cell water becomes neutral water having pH in a range from 5.8 to 8.6 to be used as drinking water.

The first pump 40 may operate under the control of the water treatment controller 90 and move the fuel cell water stored in the first water tank 20 into the second water tank 50.

The second water tank 50 may temporarily store the fuel cell water received from the first water tank 20 by the first pump 40. For example, the second water tank 50 may be used as an auxiliary tank to prevent the fuel cell water from being filled in a specific amount or more in the first water tank 20. The second water tank 50 may sense an amount of the stored fuel cell water to provide the sensing information on the amount of the stored fuel cell water to the water treatment controller 90. In one embodiment, the second water tank 50 may include a level sensor to sense the amount of the stored fuel cell water by sensing a water level of the stored fuel cell water.

The second water tank 50 may temporarily store the filtered fuel cell water before the user uses the filtered fuel cell water. The second water tank 50 may include a water feeding port connected to the first pump 40 to receive the fuel cell water and a supplementary water feeding port to receive water (supplementary water) from the outside. For example, when the user (driver) wants to use the water stored in the second water tank 50 as cleaning water, and when the internal water of the second water tank 50 is insufficient or the user wants to cool down the hot water in the second water tank 50, the port may be additionally provided in the second water tank 50, such that the user may receive the supplementary water from the outside.

In addition, the second water tank 50 may include an outlet to discharge the fuel cell water to the outside, and the opening and the closing of the outlet may be adjusted under the control of the water treatment controller 90. In other words, the fuel cell water stored in the second water tank 50 may be transferred to the cleaning device 70 and used as cleaning water, or may be forcibly discharged to the outside.

The second pump 60 may supply water (fuel cell water or supplementary water), which is stored in the second water tank 50, to the cleaning device 70. The second pump 60 may automatically operate when a faucet lever of the cleaning device 70 is operated.

The cleaning device 70 may allow a user to use the water, which is stored in the second water tank 50, as the cleaning water. The cleaning device 70 may be provided at the side of the hydrogen electric vehicle, as illustrated in FIG. 3. In one embodiment, the cleaning device 70 may include a washbasin, a faucet head, and a faucet lever. The cleaning device 70 may be provided with a sliding structure, such that the user may hold the washbasin with a hand and pull the washbasin out of the hydrogen electric vehicle. The user may also push and put the washbasin into the vehicle after using the washbasin. In other words, the cleaning device 70 can be slidably extracted from or retracted into an interior surface of the vehicle for use.

The sewage container 80 may be connected to a drain pipe of the washbasin to store a sewage discharged through the washbasin. The sewage container 80 may sense an amount of the stored sewage to provide the sensing information on the sewage to the water treatment controller 90. The sewage container 80 may include a level sensor to sense an amount of sewage by sensing a water level of the stored sewage. The sewage container 80 may include an outlet to discharge the stored sewage to the outside, and the opening and closing of the outlet may be handled under the control of the water treatment controller 90.

The water treatment controller 90 may totally control the operation of the system for treating the fuel cell water. The water treatment controller 90 may automatically move or discharge the fuel cell water, when a preset condition is satisfied. The water treatment controller 90 may determine whether an external temperature of the hydrogen electric vehicle is lower than a preset temperature (for example, 10° C.), based on information sensed by the temperature sensor 10 after an ignition of the hydrogen electric vehicle is turned off. The water treatment controller 90 may perform an algorithm to prevent the fuel cell water, which is stored in the first water tank 20 and the second water tank 50, from being frozen, when the external temperature of the hydrogen electric vehicle is lower than a preset temperature.

Although the fuel cell water stored in the water tank is not frozen while the hydrogen electric vehicle is in operation, when the ignition of the hydrogen electric vehicle is turned off and the hydrogen electric vehicle is not in operation for a longer time, the fuel cell water stored in the water tank may be frozen. When water is frozen, the volume of the water is increased. When the fuel cell water stored in the water tank exceeds a specific amount and the fuel cell water is frozen, the water tank may be cracked, so the fuel cell water may leak later through the cracks. According to the present embodiment, the water treatment controller 90 may manage the fuel cell water to prevent the water tank from being cracked, even if the fuel cell water is frozen.

When the external temperature of the hydrogen electric vehicle is lower than the preset temperature after the ignition of the hydrogen electric vehicle is turned off (i.e., the vehicle is turned off), amounts of fuel cell water stored in the first water tank 20 and the second water tank 50 may be controlled not to exceed a preset level. For example, the water treatment controller 90 may forcibly and automatically discharge the fuel cell water, which is stored in the water tanks 20 and 50, to the outside of the tanks. In addition, the water treatment controller 90 may output an alarm message when the water levels of the first water tank 20 and the second water tank 50 exceed the preset level or a reference value (e.g., 80% of a full level of water in the tanks). Alternatively, when the water treatment controller 90 outputs a message for notifying the necessity of the forcible discharge to the driver, and when the ignition is not turned on or a discharge instruction through the drain switch 92 is not received until a specific time is elapsed, the water treatment controller 90 may automatically and forcibly discharge the fuel cell water stored in the water tanks 20 and 50 to the outside. The water treatment controller 90 may stop the forcible discharge, when the ignition of the hydrogen electric vehicle is turned on while the fuel cell water is forcibly discharged.

The water treatment controller 90 may notify the driver of the possibility in which the fuel cell water is frozen and may induce the driver to discharge the fuel cell water, even if the water levels of the first water tank 20 and the second water tank 50 do not exceed the reference value. In addition, the water treatment controller 90 may manage an amount of sewage stored in the sewage container 80 such that the amount of the sewage does not exceed a specific level (e.g., 80% of the storage capacity). For example, the water treatment controller 90 may notify a user of that the water level of the sewage container 80 reaches a preset level to induce the user to discharge the sewage from the sewage container 80, when the water level of the sewage container 80 reaches the preset level.

The water treatment controller 90 may display the present water levels of the first water tank 20, the second water tank 50, and the sewage container 80, based on information from level sensors of the first water tank 20, the second water tank 50, and the sewage container 80, respectively.

The drain switch 92 may be connected to the water treatment controller 90 such that the driver may manually control the operation of the water treatment controller 90. For example, the drain switch 92 may include a discharge switch and a cleaning switch. When the driver turns on the discharge switch or the cleaning switch, the water treatment controller 90 may control the operation of the first pump 40 and the opening and the closing of the outlet of the second water tank 50 such that the movement or the forcible discharge of the fuel cell water is controlled, even if the water treatment controller 90 fails to satisfy the above condition.

Figure 4:
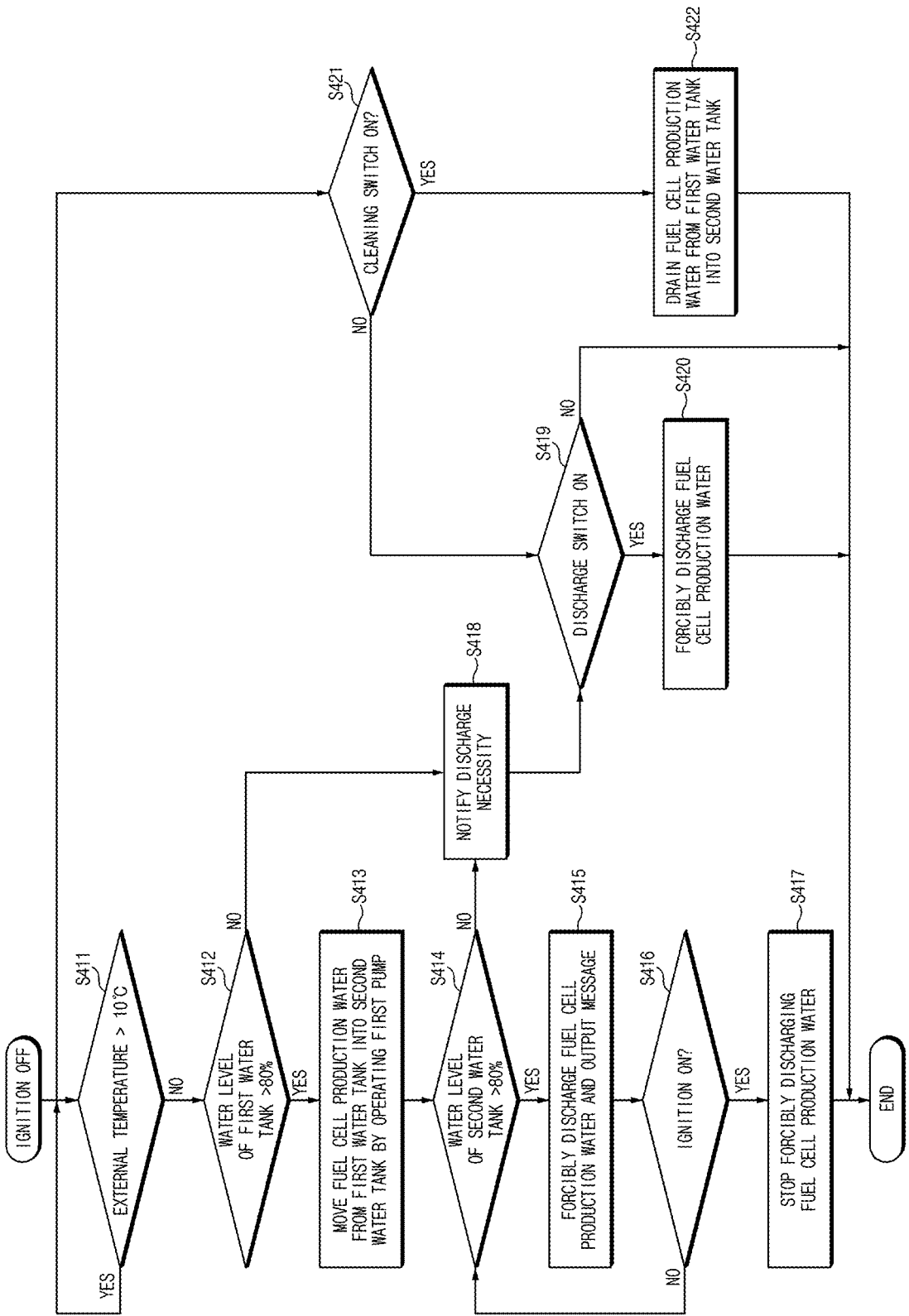
FIG. 4 is a flowchart illustrating the operating procedure of the system for treating the fuel cell water of FIG. 1.

FIG. 4 is a flowchart illustrating the operating procedure of the system for treating the fuel cell water of FIG. 1.

The water treatment controller 90 may determine whether an external temperature of the hydrogen electric vehicle is lower than a preset temperature (for example, 10° C.), based on information from the temperature sensor 10 when the ignition of the hydrogen electric vehicle is turned off (Ignition Off) (S411).

When the external temperature of the hydrogen electric vehicle is lower than the preset temperature, depending on the determination result in S411, the water treatment controller 90 may determine whether the water level of the first water tank 20 exceeds a preset first level (for example, 80% of the maximum water level), based on the information received from the level sensor provided in the first water tank 20 (S412).

When the water level of the first water tank 20 exceeds the first level depending on the determination result in S412, the water treatment controller 90 may move the fuel cell water, which is stored in the first tank 20, into the second water tank 50 by operating the first pump 40 (S413).

In this case, the water treatment controller 90 may move the fuel cell water into the second water tank 50 by operating the first pump 40 until the water level of the first water tank 20 reaches the first level, or by operating the first pump 40 until the water level of the first water tank 20 reaches the preset second level which is lower than the first level, or the first water tank 20 is empty.

The water treatment controller 90 may determine whether the water level of the second water tank 50 exceeds the first level, based on information received from the level sensor provided in the second water tank 50, after moving the fuel cell water, which is stored in the first water tank 20, into the second water tank 50 (S414).

When the water level of the second water tank 50 exceeds the first level depending on the determination result in S414, the water treatment controller 90 may forcibly discharge the fuel cell water stored in the second water tank 50 to the outside by opening the outlet of the second water tank 50 (S415).

The water treatment controller 90 may output a message for notifying a driver of that the fuel cell water is forcibly discharged while discharging the fuel cell water to the outside, such that the driver recognizes the forcible discharge of the fuel cell water. For example, the water treatment controller 90 may output a buzzer sound while lighting a cluster warning sentence of indicating that the driver turns on the ignition, when the driver does not want the forcible discharge of the fuel cell water as the fuel cell water is forcibly discharged. The buzzer sound may be used in common when the driver does not fasten a seatbelt.

When the ignition of the hydrogen electric vehicle is turned on while the fuel cell water is forcibly discharged to the outside (Ignition On) (S416), the water treatment controller 90 may stop forcibly discharging the fuel cell water (S417).

By stopping forcibly discharging the fuel cell water when the ignition of the hydrogen electric vehicle is turned on, the driver may discharge the fuel cell water to a safer place or a place allowing easy discharge. For example, when the fuel cell water is forcibly discharged, the fuel cell water is forcibly discharged regardless of places. Accordingly, the place in which the fuel cell water is forcibly discharged may not be a proper place to discharge the fuel cell water. Accordingly, when the driver recognizes the forcible discharge of the fuel cell water and turns on the ignition of the hydrogen electric vehicle to move the vehicle to discharge the fuel cell water to other place, the water treatment controller may stop forcibly discharging the fuel cell water.

Therefore, when the ignition is turned on, stopping forcibly discharging the fuel cell water may be provided as an optional function of the present embodiment.

When the water level of the first water tank 20 does not exceed the first level in S412, or when the water level of the second water tank 50 does not exceed the first level in S414, the water treatment controller 90 may induce the fuel cell water to be discharged by outputting, to the driver, a notification message for indicating that it is more preferred that the stored fuel cell water is discharged, as the fuel cell water may be frozen due to a lower external temperature (S418).

For example, the water treatment controller 90 may light the cluster warning sentence of notifying that it is necessary to discharge the fuel cell water while outputting a buzzer sound, to notify that the fuel cell water may be frozen even though the amount of the fuel cell water stored in the water tanks 20 is not in a dangerous level. Similarly, the buzzer sound may be used in common when the driver does not fasten the seat belt.

When the discharge switch of the drain switch 92 is turned on (S419) after outputting the notification message in S418, the water treatment controller 90 may forcibly discharge the fuel cell water (S420).

For example, the water treatment controller 90 may move the fuel cell water stored in the first water tank 20 into the second water tank 50 by operating the first pump 40, while discharging the fuel cell water stored in the second water tank 50 to the outside by opening the outlet of the second water tank 50. Accordingly, the water treatment controller 90 may discharge the fuel cell water, which is stored in the first water tank 20 and the second water tank to the outside.

Although the embodiment has been described above in that the water treatment controller 90 discharges the fuel cell water, when the external temperature of the hydrogen electric vehicle is lower than the preset temperature (e.g., 10 degrees Celsius (° C.)), the water treatment controller 90 may move the fuel cell water from the first water tank 20 into the second water tank 50 or may discharge the fuel cell water to the outside, such that the fuel cell water is used as the cleaning water, depending on the instruction (the operation of the drain switch 92) of the user (driver) regardless of the external temperature.

For example, the water treatment controller 90 may move the fuel cell water, which is stored in the first water tank 20, into the second water tank 50 by operating the first pump 40, such that the fuel cell water stored in the first water tank 20 is used as the cleaning water (S422), when a cleaning switch of the drain switch 92 is turned on (S421).

In this case, the water treatment controller 90 may continuously operate the first pump 40 until the cleaning switch is turned off. Alternatively, the pump 40 may be burdened when the pump continuously operates even though the first water tank 20 is empty. Accordingly, the water treatment controller 90 may automatically stop the operation of the first pump 40, when it is determined that the first water tank 20 is completely empty, based on information from the level sensor of the first water tank 20, even though the cleaning switch is not turned off.

When the user handles the faucet lever of the cleaning device the second pump 60 automatically operates. Accordingly, the fuel cell water stored in the second water tank 50 may be discharged to the washbasin through the faucet head of the cleaning device 70. The fuel cell water discharged through the faucet head and used as the cleaning water may be stored in the sewage container 80 through the drain pipe of the washbasin.

When an amount of fuel cell water stored in the second water tank 50 is insufficient, the second water tank 50 may include the supplement water feeding port to receive the supplement water, such that the user supplements water into the second water tank 50

The water treatment controller 90 may monitor the water level of the sewage container 80 through the level sensor of the sewage container 80. When the water level of the sewage container 80 is higher than a preset level, the water treatment controller 90 may notify the user of that the water level of the sewage container 80 higher than the preset level, thereby inducing the discharge the sewage from the sewage container 80. In other words, since the sewage may contaminate a surrounding area when forcibly discharged, the water treatment controller 90 may output the notification message to the user, thereby inducing the user to discharge the sewage to a proper place.

When the cleaning switch is not turned on in S421, the water treatment controller 90 determines whether the discharge switch is turned on (S419). When the discharge switch is turned on, the water treatment controller 90 may forcibly discharge the fuel cell water as in S420 described above.

Although, in the embodiments described above, the fuel cell water is instantly forcibly discharged when the water level of the first water tank 20 exceeds the first level, the water treatment controller 90 may output a message (e.g., a buzzer sound, a cluster warning sentence, other audible warning, other visual notice, and the like) for notifying a driver of the necessity of the forcible discharge of the fuel cell water before forcibly discharging the fuel cell water. When the ignition of the hydrogen electric vehicle is not turned on or when the discharge instruction is not received through the drain switch 92 until a specific time is elapsed, the water treatment controller 90 may forcibly discharge the fuel cell water as described above.

In the above-described embodiment, a case in which the fuel cell water treatment system of the present disclosure is applied to the hydrogen electric vehicle has been described as an example. However, the fuel cell water treatment system may be applied to all mobilities (for example, ships, aircrafts, trains, and the like) using a hydrogen fuel cell as a power source.

According to an embodiment of the present disclosure, the fuel cell water, which is produced from the fuel cell of the hydrogen electric vehicle, may be effectively utilized, and a dangerousness caused by the frozen fuel cell water may be prevented in advance in the process of utilizing the fuel cell water.

The above description is merely an example of the technical idea of the present disclosure, and various modifications and modifications may be made by one skilled in the art without departing from the essential characteristic of the present disclosure.

Accordingly, embodiments of the present disclosure are intended not to limit but to explain the technical idea of the present disclosure, and the scope and spirit of the present disclosure is not limited by the above embodiments. The scope of protection of the present disclosure should be construed by the attached claims, and all equivalents thereof should be construed as being included within the scope of the present disclosure.

Hereinabove, although the present disclosure has been described with reference to exemplary embodiments and the accompanying drawings, the present disclosure is not limited thereto, but may be variously modified and altered by those having ordinary skill in the art to which the present disclosure pertains without departing from the spirit and scope of the present disclosure.

What is claimed is:

1. A system for treating fuel cell water produced from a fuel cell in a mobility device, the system comprising:
   a fuel cell water storage configured to receive and store the fuel cell water discharged from the fuel cell;
   a cleaning device configured to be extracted from or retracted into an inside of the mobility device and configured to receive the fuel cell water from the fuel cell water storage and to discharge the fuel cell water through a faucet head of the cleaning device; and
   a water treatment controller configured to control an amount of the fuel cell water stored in the fuel cell water storage such that the amount does not exceed a preset level when an external temperature of the mobility device is lower than a preset temperature.

2. The system of claim 1, wherein the cleaning device is configured to be slidably extracted from or retracted into an inside of the mobility device.

3. The system of claim 1, wherein the fuel cell water storage includes:
a first water tank configured to receive and store the fuel cell water from the fuel cell and including a first level sensor to sense a water level of the fuel cell water stored in the first water tank;
a second water tank configured to receive and store the fuel cell water from the first water tank and including a second level sensor to sense a water level of the fuel cell water stored in the second water tank; and
a first pump configured to move the fuel cell water stored in the first water tank into the second water tank.

4. The system of claim 3, further comprising:
a filter interposed between the first water tank and the second water tank to filter out a pollutant from the fuel cell water moving from the first water tank to the second water tank.

5. The system of claim 3, further comprising:
a temperature sensor configured to sense an external temperature of the mobility device.

6. The system of claim 5, wherein:
the water treatment controller is configured to:
sense the external temperature of the mobility device through the temperature sensor;
sense an amount of the fuel cell water stored in the first water tank through the first level sensor; and
move the fuel cell water stored in the first water tank into the second water tank by operating the first pump when the external temperature of the mobility device is lower than the preset temperature and the amount of the fuel cell water stored in the first water tank is higher than the preset level.

7. The system of claim 6, wherein the water treatment controller is configured to:
sense an amount of fuel cell water stored in the second water tank through the second level sensor; and
when the amount of the fuel cell water stored in the second water tank is higher than a preset level, forcibly discharge the fuel cell water, which is stored in the second water tank, to an outside by opening an outlet of the second water tank.

8. The system of claim 7, further comprising:
a drain switch configured to control an operation of the water treatment controller, based on handling of a user.

9. The system of claim 8, wherein the drain switch includes:
a discharge switch controlled by the water treatment controller to forcibly discharge the fuel cell water; and
a cleaning switch controlled by the water treatment controller to operate the first pump.

10. The system of claim 7, wherein the water treatment controller is configured to:
sense the external temperature; and
sense the amounts of the fuel cell water stored in the first water tank and the second water tank,
when an ignition of the mobility device is turned off.

11. The system of claim 7, wherein the water treatment controller is configured to:
stop forcibly discharging the fuel cell water when an ignition of the mobility device is turned on while the fuel cell water stored in the second water tank is forcibly discharged to the outside.

12. The system of claim 7, wherein the water treatment controller is configured to:
before the fuel cell water is forcibly discharged, output a message for notifying necessity of forcibly discharging the fuel cell water to a user; and
forcibly discharge the fuel cell water when an ignition of the mobility device is not turned on until a specific time is elapsed.

13. The system of claim 7, wherein the water treatment controller is configured to:
output a message for notifying a user of that forcibly discharging fuel cell water is in progress when the fuel cell water is forcibly discharged.

14. The system of claim 6, further comprising:
a sewage container connected to a washbasin of the cleaning device to store sewage discharged through a drain pipe of the washbasin, the sewage container including a third level sensor to sense a water level of the sewage in the sewage container,
wherein the water treatment controller is configured to:
sense an amount of the sewage stored in the sewage container through the third level sensor; and
output a message for notifying a user of that the amount of the sewage in the sewage container is higher than a preset level.

15. The system of claim 3, further comprising:
a second pump configured to operate through handling of a faucet lever of the cleaning device and configured to discharge the fuel cell water, which is stored in the second water tank, through the faucet head.

* * * * *